United States Patent [19]

Zamora et al.

[11] Patent Number: 4,833,610

[45] Date of Patent: May 23, 1989

[54] MORPHOLOGICAL/PHONETIC METHOD FOR RANKING WORD SIMILARITIES

[75] Inventors: Antonio Zamora; Elena M. Zamora, both of Chevy Chase, Md.

[73] Assignee: International Business Machines Corporation, Armonk, N.Y.

[21] Appl. No.: 134,332

[22] Filed: Mar. 7, 1988

Related U.S. Application Data

[63] Continuation of Ser. No. 942,123, Dec. 16, 1986, abandoned.

[51] Int. Cl.$^4$ .................................................. G05B 1/00
[52] U.S. Cl. .................................... 364/419; 434/167
[58] Field of Search .............. 364/419, 200 MS File, 364/900 MS File; 340/146.2; 434/167

[56] References Cited

U.S. PATENT DOCUMENTS

| | | | |
|---|---|---|---|
| 4,328,561 | 4/1982 | Convis et al. | 364/900 |
| 4,355,371 | 10/1982 | Convis et al. | 364/900 |
| 4,503,426 | 3/1985 | Mikulski | 364/900 |
| 4,580,241 | 4/1986 | Kucera | 364/900 |
| 4,674,066 | 6/1987 | Kucera | 364/900 |

OTHER PUBLICATIONS

N. Kaku et al., "Input Method Useful for Text and Language Processing in Japanese Word Processor", *IBM TDB*, 12/84, p. 4070.

J. J. Pollack/A. Zamora, "Automatic Spelling Correction in Scientific and Scholarly Text", *Communications of the ACM*, 27(4), pp. 358-368, (1984).

P. N. Yianilos, "A Dedicated Comparator Matches Symbol Strings Fast and Intelligently," *Electronics*, 12/1/83, pp. 113-117.

*Primary Examiner*—Allen MacDonald
*Attorney, Agent, or Firm*—John E. Hoel

[57] ABSTRACT

A computer method is disclosed for ranking word similarities which is applicable to a variety of dictionary applications such as synonym generation, linguistic analysis, document characterization, etc. The method is based upon transforming an input word string into a key word which s invariant for certain types of errors in the input word, such as the doubling of letters, consonant/vowel transpositions, consonant/consonant transpositions. The specific mapping technique is a morphological mapping which generates keys which will have similarities that can be detected during a subsequent ranking procedure. The mapping is defined such that unique consonants of the input word are listed in their original order followed by the unique vowels for the input words, also in their original order. The keys thus generated will be invariant for consonant/vowel transpositions or doubled letters. The utility of the keys is further improved by arranging the consonants in the keys in alphabetical order followed by arranging the vowels in the keys in alphabetical order. The resultant mapping is insensitive to consonant/consonant transpositions, as well as consonant/vowel transpositions and doubled letters. The method then continues by applying a ranking technique which makes use of a compound measure of similarity for ranking the key words.

3 Claims, 1 Drawing Sheet

DETERMINATION OF THE SIMILARITY OF TWO STRINGS.

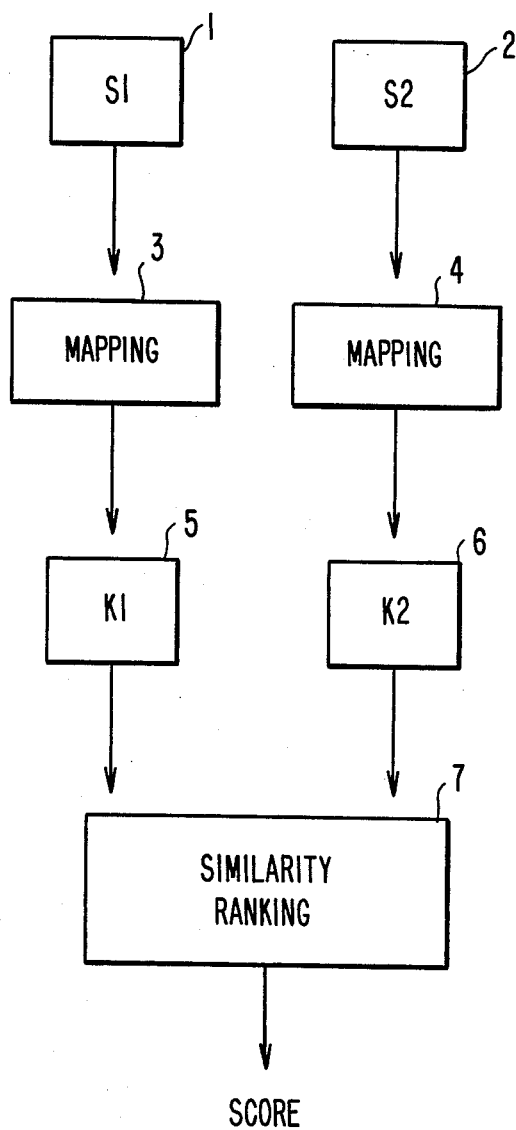

MORPHOLOGICAL/PHONETIC METHOD FOR RANKING WORD SIMILARITIES

This is a continuation of application Ser. No. 942,123, filed Dec. 16, 1986 now abandoned.

BACKGROUND OF THE INVENTION

1. Technical Field

The invention disclosed broadly relates to data processing and more particularly relates to linguistic applications in data processing.

2. Background Art

Text processing word processing systems have been developed for both stand-alone applications and distributed processing applications. The terms text processing and word processing will be used interchangeably herein to refer to data processing systems primarily used for the creation, editing, communication, and/or printing of alphanumeric character strings composing written text. A particular distributed processing system for word processing is disclosed in the copending U.S. patent application Ser. No. 781,862 filed Sept. 30, 1985, now U.S. Pat. No. 4,731,735, entitled "Multilingual Processing for Screen Image Build and Command Decode in a Word Processor, with Full Command, Message and Help Support," by K. W. Borgendale, et al. The figures and specification of the Borgendale, et al. patent application are incorporated herein by reference, as an example of a host system within which the subject invention herein can be applied.

Previous work has described procedures for reducing the number of candidate words that have to be examined relative to a specific misspelled word to find a list of the best matched candidate words. One technique looks only at those words that differ in length by less than two characters and which retain the same initial character. Another technique uses a vector fetch approach which assigns each word in the dictionary a magnitude value based on the confusability of the characters in the word and only those words within a specific magnitude range of the misspelled word are retrieved. These techniques have been supplemented by double indexing ambiguous or silent first letters (e.g., phonograph under "P" and "F," knight under "K" and "N") to improve their performance in standard office environments.

Independent of these spelling aid techniques, statistical methods for determining similarities between strings have been developed and even implemented as integrated circuits. Methods such as the SOUNDEX system have been used to cluster names with similar phonetic characteristics to provide candidate file entries that then have to be screened manually for relevance.

Although these methods provide sets of candidate words, they have not integrated the morphological and phonetic components of language and, therefore, the candidates that they produce may be irrelevant or ranked in implausible order.

OBJECTS OF THE INVENTION

It is therefore an object of the invention to provide an improved data processing technique to rank the similarity of word strings.

It is another object of the invention to provide an improved technique for ranking the similarity of word strings so as to be immune to spelling errors in the input words.

It is still a further object of the invention to provide an improved technique for ranking the similarity of word strings which is more accurate and reliable than has been available in the prior art.

SUMMARY OF THE INVENTION

These and other objects, features and advantages of the invention are accomplished by the morphological phonetic method for ranking word similarities disclosed herein. A computer method is disclosed for ranking word similarities which is applicable to a variety of dictionary applications such as synonym generation, linguistic analysis, document characterization, etc. The method is based upon transforming an input word string into a key word which is invariant for certain types of errors in the input word, such as the doubling of letters, consonant/vowel transpositions, consonant/consonant transpositions. The specific mapping technique is a morphological mapping which generates keys which will have similarities that can be detected during a subsequent ranking procedure. The mapping is defined such that unique consonants of the input word are listed in their original order followed by the unique vowels for the input words, also in their original order. The keys thus generated will be invariant for consonant/vowel transpositions or doubled letters. The utility of the keys is further improved by arranging the consonants in the keys in alphabetical order followed by arranging the vowels in the keys in alphabetical order. The resultant mapping is insensitive to consonant/consonant transpositions, as well as consonant/vowel transpositions and doubled letters. The method then continues by applying a ranking technique which makes use of a compound measure of similarity for ranking the key words. By first measuring the number of basic operations needed to convert an input-derived key word into a dictionary-derived key word (the higher the number, the less similar are the words) and then secondly measuring the length of identical character segments in each pair of key words being matched (the longer the length, the greater the similarity), there is developed a scoring system for ranking the similarity of an input word to dictionary-derived key words, which ignores misspellings in the input word.

The salient features of the invention are: (1) the selection of morphological keys which are of particular value in the identification of string similarities; and (2) the use of the minimum distance measure between the sets of morphological and phonetic keys of two words as a criterion for their similarity. This means that the features that make two words similar will be taken into consideration regardless of whether these similarities are morphological OR phonetic.

BRIEF DESCRIPTION OF THE DRAWINGS

These and other objects, features and advantages will be more fully appreciated with reference to the accompanying figures:

FIG. 1 is a flow diagram illustrating the determination of the proximity between two strings, in accordance with the invention.

DESCRIPTION OF THE BEST MODE FOR CARRYING OUT THE INVENTION

It has been discovered that, given a misspelling or phonetic string, the most relevant candidates that can be obtained from a dictionary are those that have the closest phonetic or morphological characteristic. Determination of the proximity between two strings is accomplished as illustrated in FIG. 1. Two strings, S1 and S2 are transformed using mapping functions into keys K1 and K2, respectively. The keys are then compared by a similarity ranking procedure to produce a score that indicates the degree of proximity between the two keys. The scores for a list of candidates can be used to order the list so that the most likely candidates are at the top.

Mapping

Mapping is the process of transforming one string into another representation (called a "key"). This invention recognizes three important types of mapping. (1) A null mapping is one that copies a string without changing it. (2) A morphological mapping is one that transforms a string based on its structural characteristics. (3) a Phonetic mapping is one where the transformations are performed on the basis of the sounds represented by components of the input string. The similarity ranking procedure can be applied to the keys produced by any of these three mappings.

Implications of Mapping

Mapping transformations can potentially change the way in which characters are represented without altering the underlying principles of similarity measurement described by this invention. The computer codes used to represent the alphabetic characters are different for ASCII, EBCDIC or other internal codes; what remains fundamentally unaltered, however, is the way in which the characters representing the words are partitioned into consonants or vowels. Vowels include "AEIOU," the letter "Y," and their representations with acute, grave, circumflex, tilde, dieresis, and other diacritical marks used in many European languages. Letters such as the Nordic "O" with a slash and the "AE" or "OE" ligatures are also considered vowels. The consonants include the remaining letters of the English alphabet plus the Spanish "N" with tilde, French cedilla, the Icelandic "thorn" and slashed "D." In the Greek and Cyrillic character sets, "vowels" are those associated with voiced characters and the remaining characters are the consonants.

Mappings can be specified as a set of operations on a sequence of characters to obtain a new sequence of characters that may or may not resemble the original string. The set of operations can involve the selection of certain categories of letters (such as vowels) and their rearrangement, or it can involve the transformation of letter sequences into other sequences of letters, phonetic codes, computer codes, etc. Such transformations can be expressed as "rewrite rules" which are either specific or generic. The rule "SS"→"S" indicates that the specific string "SS" should be replaced by "S," whereas a rule such as "##"→"#" could indicate a replacement of all adjacent doubled characters by a single occurrence.

Morphological Mapping

The purpose of a morphological mapping is to create keys that are invariant for certain types of errors, such as doubling of letters, in the input string. The keys of such variants will have similarities that will be detected during the ranking procedure.

EXAMPLE 1

If we define mapping such that the unique consonants of the input are listed in their original order followed by the unique vowels, also in their original order, then the following keys will be produced:

| input string | key |
| --- | --- |
| DETERMINE | DTRMNEI |
| DETREMINE | DTRMNEI |
| DETERRMINE | DTRMNEI |
| DETEMRINE | DTMRNEI |

As can be seen from the keys generated, this mapping generates identical keys for any consonant/vowel transpositions or doubled letters, whereas consonant/consonant transpositions generate different keys.

EXAMPLE 2

If we define a mapping such that the unique consonants of the input are listed in alphabetical order followed by the unique vowels, also in alphabetical order, then the following keys will be produced:

| input string | key |
| --- | --- |
| DETERMINE | DMNRTEI |
| DETREMINE | DMNRTEI |
| DETERRMINE | DMNRTEI |
| DETEMRINE | DMNRTEI |

This mapping is insensitive to consonant/vowel transpositions, consonant/consonant transpositions, and doubled letters.

Phonetic Mapping

Phonetic mapping creates keys that are invariant for similar sounds. Phonetic keys can be constructed from the input strings by application of text-to-speech rules. Also, by reducing the precision of the pronunciation, it is possible to increase the set of words that share similar sounds. Both one-to-many and many-to-one mappings are allowed (e.g., "X"→"K" and "PH"→"F," respectively). The mapping procedures may be implemented in a variety of ways to detect and eliminate silent letters.

EXAMPLE 3

Define a mapping such that "CC" generates "KS," "X" generates "KS," "CE" generates "SE," other letters map to themselves, and all multiple letters are reduced to single letters.

| input string | key |
| --- | --- |
| ACCESS | AKSES |
| AXES | AKSES |
| EXCESS | EKSES |

The word "EXCESS" generates the intermediate "EKSSESS" by simple substitution, and finally becomes the key "EKSES" after duplicate letter removal.

Similarity Ranking

Similarity between two strings is a property that can be measured in terms of the operations required to convert one string into another. There are four basic operations that can be used to convert strings: substitution, transposition, insertion, and deletion. The string "ABCD" can be converted into the string "ABXX" by two different substitutions, into "BACD" by transposition of the first two characters, into "ABD" by deletion of one character, and into "ABXCD" by insertion of one character. Although transposition may be viewed as consisting of one deletion and one insertion, it is generally considered one basic operation.

The number of basic operations (NBO) required to convert one string into another can be obtained by iteratively testing the characters of one string against the other. When the characters are different, it is possible to determine whether the error is one of substitution insertion, deletion, or transposition by scanning ahead until equal characters are found. When the characters being compared are again synchronized, the process is repeated until the end of the shortest string is reached and the remaining characters in the longer string, if any, are considered insertion errors.

Another measure of string similarity is the length of their common substrings. Thus, the string "PERFORMACE" and the word "PERFORMANCE" have one common substring of length 8 ("PERFORMA") and antoher one of length 2 ("CE"). The word "PERFORMABLE" has substrings of length 8 and 1 in common with the string "PERFORMACE." It is possible to design a score function that reflects the fragmentation and the location of the disparities by associating weight factors with the lengths of the common substrings and by normalizing with respect to the maximum possible. This allows us to rank the similarity of the strings "PERFORMANCE," "PREFORMANCE," "PERFROMANCE," etc.

A measure of similarity based on the common substrings occurring in two strings can be constructed as follows: given two strings of length L1 and L2 having common substrings of length X1, X2, . . . , such that X1+X2+ . . . ←MIN(L1,L2) a measure (M) of their similarity can be obtained by adding the sum of the squares of the substring lengths and dividing by the square of L1 or L2, whichever is smaller and subtracting the result from one, i.e., M=1—(X1*X1+X2*X2+ . . . )/(MIN(L1,L2)*MIN(L1,L2))). M will have fractional values from 0 to 1, and the words will be most similar when M is closer to zero.

M, by itself, is not sufficient as a string similarity measure since it only represents the size of the common substrings relative to the maximum possible common substring. The sum of NBO and M, however, can serve as a uniform measure for comparing two strings, and the closer the sum is to zero, the more similar the strings are.

The string similarity measures may be applied against input strings (null mappings) or against the keys derived from them. The similarities revealed by the combined effect of word mapping and similarity ranking is illustrated by counting the basic transformation operations required to change one word into another and by determining their common substrings. The following examples are for a null mapping, for the morphological key in example 1, and for the phonetic key in example 3.

|  |  |  | Basic Operations | Lengths of Common Substrings |
|---|---|---|---|---|
| Null Mapping | | | | |
| string: | ACCESS | AXES | | |
| key: | ACCESS | AXES | 3 | 1,2 |
| string: | AXES | EXCESS | | |
| key: | AXES | EXCESS | 3 | 1,2 |
| Morphological Mapping | | | | |
| string: | ACCESS | AXES | | |
| key: | CSAE | XSAE | 1 | 3 |
| string: | AXES | EXCESS | | |

|  |  |  | Basic Operations | Lengths of Common Substrings |
|---|---|---|---|---|
| key: | XSAE | XCSE | 2 | 1,1,1 |
| Phonetic Mapping | | | | |
| string: | ACCESS | AXES | | |
| key: | AKSES | AKSES | 0 | 5 |
| string: | AXES | EXCESS | | |
| key: | AKSES | EKSES | 1 | 4 |

The words used for illustration differ substantially in their surface structure, however, the mappings bring out similarities in the morphological or phonetic structure of the strings that result in better scores (reflected by lower number of basic operations and longer common substrings). In practice, the scoring mechanism may examine the results of several keys to determine the closest morphological or phonetic neighbors and select the candidates with the best scores.

While this invention has been described with reference to a specific set of mapping functions and scoring mechanisms, it will be understood by those skilled in the art that the spirit of this invention can be applied to languages other than English and implemented in various computer languages and with other mapping functions and scoring mechanisms without avoiding the scope of the invention claimed herein.

What is claimed is:

1. A computer method for ranking the similarity of an input word from an input word string, to words stored in a dictionary storage, comprising the steps of:
   reading a first word from the input word string and writing the consonants of the input word in a first storage location and writing the vowels of the input word in a second storage location;
   deleting duplicate consonants in the first storage location and deleting duplicate vowels in said second storage location;
   arranging said consonants in said first storage location in alphabetical order and arranging said vowels in said second storage location in alphabetical order;
   concatenating said alphabetized consonants in said first storage location with said alphabetized vowels in said second storage location to form an input key word;
   reading a dictionary word from a dictionary of stored words and writing the consonants of the dictionary word in a third storage location and the vowels of the dictionary word in a fourth storage location;
   deleting duplicate consonants in said third storage location and duplicate vowels in said fourth storage location;
   arranging the consonants in said third storage location in alphabetical order and arranging the vowels in said fourth storage location in alphabetical order;
   concatenating the alphabetized consonants in said third storage location with the alphabetized vowels in said fourth storage location, to form a dictionary key word;
   comparing said input key word with said dictionary key word in a first comparison step by counting the number of change operations in said input key word necessary to make said input key word identically match with said dictionary key word, said count being a first scoring factor;

matching in a second step said input key word with said dictionary key word by measuring the length of identical character segments in said input key word and said dictionary key word, to form a second scoring factor;

combining said first scoring factor and said second scoring factor to obtain a score for ranking the degree of similarity of said input word with said dictionary word.

2. A computer method for ranking the similarity of an input word from an input word string, to words stored in a dictionary storage, comprising the steps of:

reading a first word from the input word string and writing the consonants of the input in a first storage location and writing the vowels of the input word in a second storage location;

deleting adjacent duplicate consonants in the first storage location and deleting adjacent duplicate vowels in said second storage location;

concatenating said consonants in said first storage location with said vowels in said second storage location to form an input key word;

reading a dictionary word from a dictionary of stored words and writing the consonants of the dictionary word in said third storage location and writing the vowels of the dictionary word in said fourth storage location;

deleting adjacent duplicate consonants in said third storage location and deleting adjacent duplicate vowels in said fourth storage location;

concatenating said consonants in said third storage location with said vowels in said fourth storage location to form a dictionary key word;

comparing said input key word with said dictionary key word in a first comparison step by counting the number of change operations in said input key word necessary to make said input key word identically match with said dictionary key word, said count being a first scoring factor;

matching in a second step said input key word with said dictionary key word by measuring the length of identical character segments in said input key word and said dictionary key word, to form a second scoring factor;

combining said first scoring factor and said second scoring factor to obtain a score for ranking the degree of similarity of said input word with said dictionary word.

3. A computer method for ranking the similarity of an input word from an input word string, to words stored in a dictionary storage, using a combined morphological/phonetic approach comprising the steps of:

reading a first word from the input word string and creating an input key word;

reading a dictionary word from a dictionary of stored words and creating a dictionary key word;

generating a morphological score by combining: (1) a first scoring factor consisting of the number of change operations required to make said input key word with said dictionary key word, and (2) a second scoring factor generated by measuring the length of identical character segments in said input key word and said dictionary key word;

creating an input phonetic key word by replacing the characters of the input word with corresponding phonetic characters expressed in a set of rewrite rules;

creating a dictionary phonetic key word by replacing the characters of said dictionary word with corresponding phonetic characters expressed in a set of rewrite rules;

generating a phonetic score by combining (1) a first scoring factor consisting of the number of change operations required to make said input phonetic key word with said dictionary phonetic key word, and (2) a second scoring factor generated by measuring the length of identical character segments in said input phonetic key word and said dictionary phonetic key word;

selecting the lower of the morphologic or phonetic score as a measure of the distance between said input word and said dictionary word.

* * * * *